United States Patent
Tkacik et al.

(10) Patent No.: US 11,567,676 B2
(45) Date of Patent: Jan. 31, 2023

(54) INLINE ENCRYPTION/DECRYPTION FOR A MEMORY CONTROLLER

(71) Applicant: NXP B.V., Eindhoven (NL)

(72) Inventors: Thomas E. Tkacik, Phoenix, AZ (US); Geoffrey Paul Waters, Austin, TX (US); Mohit Mongia, Noida (IN); James Andrew Welker, Leander, TX (US); Srdjan Coric, Winchester, MA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/246,042

(22) Filed: Apr. 30, 2021

(65) Prior Publication Data
US 2022/0350503 A1  Nov. 3, 2022

(51) Int. Cl.
*G06F 3/06* (2006.01)
(52) U.S. Cl.
CPC .......... *G06F 3/0623* (2013.01); *G06F 3/0655* (2013.01); *G06F 3/0673* (2013.01)
(58) Field of Classification Search
CPC ...... G06F 3/0623; G06F 3/064; G06F 3/0655; G06F 3/0661; G06F 3/0671; G06F 3/0673
USPC .......................... 711/163, 164; 713/162, 193
See application file for complete search history.

(56) References Cited

U.S. PATENT DOCUMENTS

| | | | |
|---|---|---|---|
| 6,240,183 B1 | 5/2001 | Marchant | |
| 6,819,766 B1 | 11/2004 | Weidong | |
| 7,472,285 B2 | 12/2008 | Graunke et al. | |
| 7,936,870 B2 | 5/2011 | Hauge et al. | |
| 8,429,420 B1* | 4/2013 | Melvin | G06F 21/79 711/163 |
| 9,152,577 B2 | 10/2015 | Rodgers et al. | |
| 9,152,814 B1 | 10/2015 | Natanzon | |
| 9,792,448 B2 | 10/2017 | Kaplan et al. | |
| 9,954,681 B2 | 4/2018 | Case et al. | |
| 10,157,153 B2* | 12/2018 | Shacham | G06F 13/385 |
| 10,261,919 B2 | 4/2019 | Ndu et al. | |
| 10,749,672 B2 | 8/2020 | Lee et al. | |
| 2002/0146118 A1 | 10/2002 | DiSanto et al. | |
| 2011/0154061 A1 | 6/2011 | Chilukuri et al. | |
| 2015/0033037 A1 | 1/2015 | Lidman | |

(Continued)

FOREIGN PATENT DOCUMENTS

| | | |
|---|---|---|
| CN | 10763226 A | 5/2020 |
| JP | 6033741 B2 | 6/2013 |
| WO | 2020219398 A1 | 10/2020 |

*Primary Examiner* — Gary J Portka

(57) ABSTRACT

Various embodiments relate to a memory controller, including: a memory interface connected to a memory; an address and control logic connected to the memory interface and a command interface, wherein the address and control logic is configured to receive a memory read request; a read inline encryption engine (IEE) connected to the memory interface, wherein the read IEE is configured to decrypt encrypted data read from the memory; a key selector configured to determine a read memory region associated with the memory read request based upon a read address where the data to be read is stored, wherein the read address is received from the address and control logic; and a key logic configured to select a first key associated with the determined read memory region and provide the selected key to the read IEE.

15 Claims, 6 Drawing Sheets

(56) References Cited

U.S. PATENT DOCUMENTS

2015/0169472 A1 6/2015 Yap et al.
2022/0029793 A1* 1/2022 Kachare .................. G06F 21/79

* cited by examiner

INLINE ENCRYPTION/DECRYPTION FOR A MEMORY CONTROLLER

TECHNICAL FIELD

Various exemplary embodiments disclosed herein relate generally to inline encryption and decryption for a memory controller, such as for example a double data rate (DDR) memory controller, and refreshing the keys used by inline encryption.

Inline encryption is the method of encrypting or decrypting data as external memory such as DDR is accessed. This allows for data to be securely stored in memory in order to prevent unauthorized access to the data. Such encryption and decryption may be accomplished in a manner that is transparent to the user or system accessing the memory.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a memory controller, including: a memory interface connected to a memory; an address and control logic connected to the memory interface and a command interface, wherein the address and control logic is configured to receive a memory read request; a read inline encryption engine (IEE) connected to the memory interface, wherein the read IEE is configured to decrypt encrypted data read from the memory; a key selector configured to determine a read memory region associated with the memory read request based upon a read address where the data to be read is stored, wherein the read address is received from the address and control logic; and a key logic configured to select a first key associated with the determined read memory region and provide the selected key to the read IEE.

Various embodiments are described, wherein the read IEE further includes: an encryption engine configured to encrypt a counter based on the read address and a nonce; a first in first out buffer (FIFO) configured to receive ciphertext data read from the memory; an XOR gate configured to XOR the ciphertext from the FIFO with the encrypted counter to produce plaintext.

Various embodiments are described, further including a valid FIFO configured to receive and output valid flags indicating when the associated plaintext is valid.

Various embodiments are described, further including a bypass gate configured to receive the encrypted counter and a bypass signal, and output 0s when decryption is to be bypassed.

Various embodiments are described, wherein the memory has a plurality of different memory regions, and the read IEE includes a plurality of different encryption engines implementing different encryption modes of operation, wherein one or more of the plurality of memory regions is associated with one of the plurality of different encryption engines.

Various embodiments are described, further including a write IEE connected to the memory interface, wherein the write IEE is configured to encrypt data to be stored in the memory.

Various embodiments are described, wherein the key selector is configured to determine a write memory region associated with a memory write request based upon a write address where the data to be stored, wherein the write address is received from the address and control logic; and the key logic is configured to select the first key associated with the determined write memory region and provide the selected first key to the write IEE.

Various embodiments are described, wherein the key logic is configured to select a second key associated with the determined write memory region and provide the selected second key to the write IEE, the write IEE further includes: a first encryption engine configured to encrypt a first data sequence number, based on the write address data and nonce, using the second key; a first tweak circuit configured to produce a first tweak based upon the encrypted first data sequence number; a first first-in-first-out buffer (FIFO) configured to receive the encrypted data sequence number; a second FIFO configured to receive plaintext data to be written into the memory; a first XOR gate configured to XOR the plaintext from the second FIFO with the first tweak; a second encryption engine configured to encrypt the output of the first XOR using a first key; a second tweak circuit configured to produce the first tweak based upon the output of the first FIFO; and a second XOR gate configured to XOR the output of the second encryption engine with the first tweak to produce a ciphertext to be written in the memory.

Various embodiments are described, further including a first valid FIFO configured to receive and output valid flags indicating when the ciphertext is valid.

Various embodiments are described, wherein the key logic is configured to select a second key associated with the determined read memory region and provide the selected second key to the read IEE, the read IEE further includes: a third encryption engine configured to encrypt a second data sequence number, based on the read address data and nonce, using the second key; a third tweak circuit configured to produce a second tweak based upon the encrypted second data sequence number; a third FIFO configured to receive the encrypted second data sequence number; a fourth FIFO configured to receive ciphertext data to be read from the memory; a third XOR gate configured to XOR the ciphertext from the fourth FIFO with the second tweak; a decryption engine configured to decrypt the output of the third XOR using a first derived key based upon the first key wherein the first derived key may be the same as the first key; a fourth tweak circuit configured to produce the second tweak based upon the output of the third FIFO; and a fourth XOR gate configured to XOR the output of the decryption engine with the second tweak to produce a plaintext.

Various embodiments are described, further including a second valid FIFO configured to receive and output valid flags indicating when the plaintext is valid.

Various embodiments are described, further including a memory scrubber configured to cycle through memory locations and at each memory location utilizing the read IEE and the write IEE to: decrypt the stored data using the first key; encrypt the decrypted stored data using a new first key; store the data encrypted with the new first key; and update a key update location, wherein the key update location indicates a boundary between data stored in the memory encrypted using the first key and the new first key.

Various embodiments are described, further including a memory scrubber configured to:

cycle through memory locations of the memory at a first rate and at each memory location utilizing the read IEE and write IEE to: decrypt the stored data using the first key; encrypt the decrypted stored data using a new first key; store the data encrypted with the new first key; update a key update location, wherein the key update location indicates a boundary between data stored in the memory encrypted using the first key and the new first key; and scan through the memory at a second rate to correct data errors using an error correction code, wherein the first and second rates are different.

Further various embodiments relate to a memory controller, including: a memory interface connected to a memory; an address and control logic connected to the memory interface and a command interface, wherein the address and control logic is configured to receive a memory access request and a write memory request; a read inline encryption engine (IEE) connected to the memory interface, wherein the read IEE is configured to decrypt encrypted data read from the memory; a write IEE connected to the memory interface, wherein the write IEE is configured to encrypt data to be stored in the memory; a key selector configured to: determine a read memory region associated with the memory read request based upon a read address where the data to be read is stored, wherein the read address is received from the address and control logic; and determine a write memory region associated with the memory write request based upon a write address where the data is to be stored, wherein the write address is received from the address and control logic; a key logic configured to select a first old key or a first new key associated with the determined read or write memory region based upon a key update location, wherein the key update location indicates a boundary between data stored in the memory encrypted using the first key and the new first key; and provide the selected key to the read or write IEE.

Various embodiments are described, further including a memory scrubber configured to cycle through memory locations and at each memory location utilizing the read IEE and the write IEE to: decrypt the stored data using the first key; encrypt the decrypted stored data using a new first key; store the data encrypted with the new first key; and update the key update location.

Various embodiments are described, further including a memory scrubber configured to: cycle through memory locations of the memory at a first rate; and at each memory location utilizing the read IEE and the write IEE to: decrypt the stored data using the first key; encrypt the decrypted stored data using a new first key; store the data encrypted with the new first key; update the key update location; and scan through the memory at a second rate to correct data errors using an error correction code, wherein the first and second rates are different.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
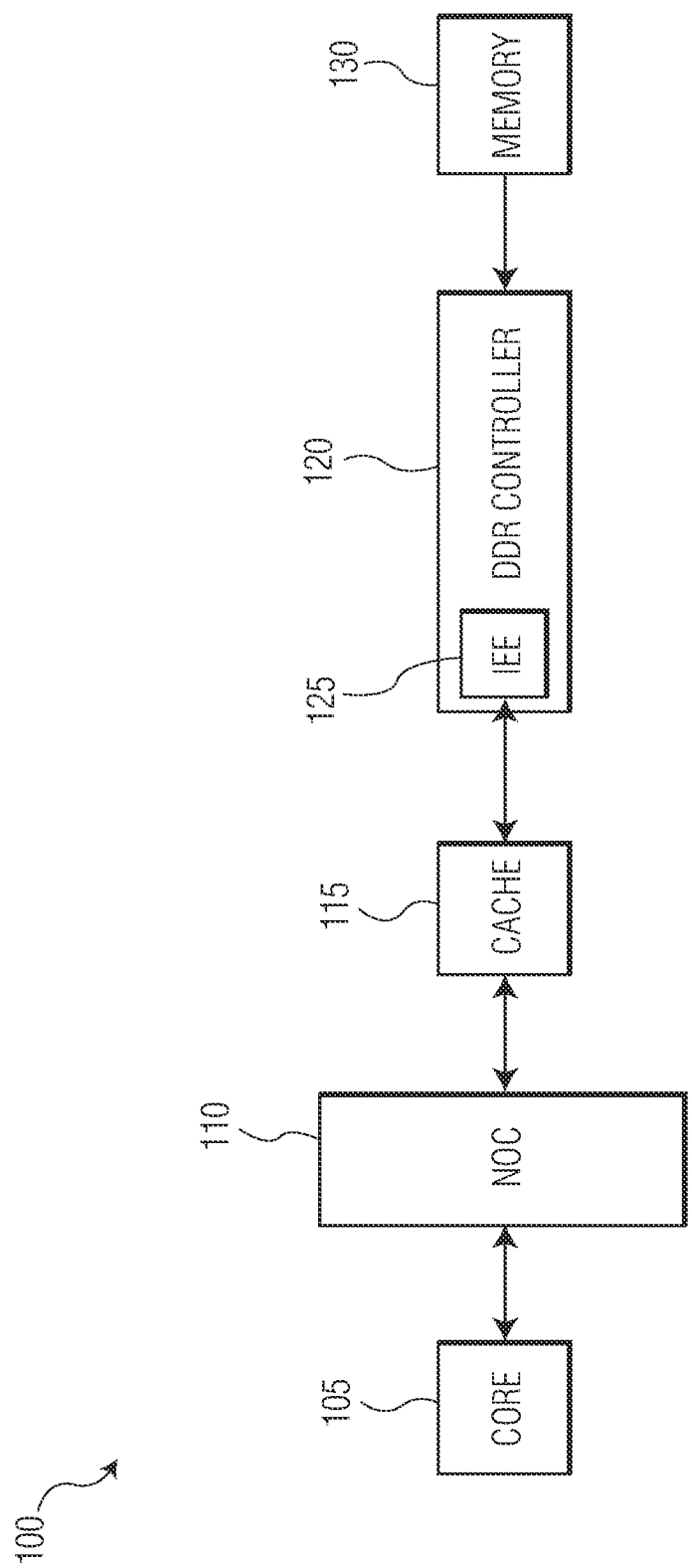
FIG. 1 illustrates a block diagram of a computing system with an IEE in a memory controller.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i e, and/or), unless otherwise indicated (e.g., "or else" or "or in the alternative"). Also, the various embodiments described herein are not necessarily mutually exclusive, as some embodiments can be combined with one or more other embodiments to form new embodiments.

In a computing system with external memory, the path between processor and memory may be snooped by an attacker. It is desirable to encrypt the data stored in the external memory. Encrypting data can be a time-consuming process. What is needed is a way of encrypting/decrypting the data stored in external memory that can be performed at the same rate as reading/writing the external memory. Such encryption should be independent of the data being encrypted, or of the user of that data (i e, the encryption should be done transparently) so that it can be easily enabled. Further, as the system may be active for a long period of time it is desirable to periodically replace current encryption keys with new keys without the necessity of bringing the system to a halt during this process. Periodically updating the encryption keys can make it more difficult for an attacker to extract a key as well as reduce the amount of data that can be decrypted by that key.

Embodiments of an inline encryption engine (IEE) and methods are disclosed that allow for fast inline encryption and decryption of data stored in memory. The system memory may be divided into multiple regions, each protected with its own key. This allows for different processes to be in different regions with their own keys. As security becomes more critical to more products, it becomes desirable to encrypt all external memory. However, DDR is a high-speed memory system and requires low latency. Accordingly, the IEE disclosed herein is fully pipelined and integrated into the memory controller data path in order to provide transparent encryption and decryption of data stored in the memory. The IEE also includes the capability of having its keys periodically updated while the memory system remains active providing continuous service without stalling. While a memory controller is described in the context of DDR, the memory controller embodiments described herein may be applied other types of memory.

In a basic IEE, the same region-specific keys may be used from power on/initialization until the next reset. In long running systems, the same keys could be used for months or even years, providing an attacker ample opportunity to perform cryptoanalysis or side channel attacks. Accordingly, it is beneficial to perform periodic key updates. Current IEEs perform key updates as part of a bulk update process that blocks access to pages while the data is decrypted with the old key and re-encrypted with the new key. One aspect of the embodiments described herein is the ability to enable two keys, an old region key and a new region key, and allow data to be decrypted and re-encrypted without blocking access to the data. This process of re-encrypting the data from the old key to the new key takes place in the background while other data processing may occur.

The embodiments of an IEE are described herein that use a hardware memory scrubber that can also be used for error correction code (ECC) memory integrity protection to refresh the old region key to a new region key without memory pages being made temporarily unavailable. A DDR controller typically includes memory scrubber hardware that scans the address space of the memory so that an ECC refresh may be performed in the background. ECC will be applied to the plaintext data if encryption is not used, or to the ciphertext data if memory encryption is enabled. In either case, the ECC is applied to the data actually stored in the memory. The IEE may reuse this scanning hardware in the DDR controller to set and track a "water level" or key update location where memory content at addresses "below" the water level has already been encrypted with the new key while memory content at addresses "above" the water level is still encrypted with the old key. ECC memory scrubbing moves the water level indicator after reading data from the memory. When key refresh is required for the address accessed by the ECC scrubber, the data will be decrypted using the old key, re-encrypted with the new key, and the newly encrypted data stored back in the memory. Memory scrubbing is a low bandwidth background process, so that the key refresh occurs, but imperceptibly to the users of system memory and without affecting the performance of the memory. Also, the memory may continue to be used during the scrubbing process.

FIG. 1 illustrates a block diagram of a computing system with an IEE in a memory controller. The computing system 100 includes a core 105, network on a chip (NOC) bus interconnect 110, cache 115, a memory controller 120 with an IEE 125, and a memory 130. The core is any processor core that may be part of a computing system. The core is connected to the NOC 110. The NOC provides an interconnect that allows various cores to access various memories and peripheral devices not shown. The NOC 110 is connected to a cache 115 that is used as short-term memory for use by the core 105. The cache 115 is connected to the memory controller 120. While memory accesses from the core may be any size, the cache will always make memory accesses of a size that is a multiple of the encryption data block size. The cache acts as a buffer to prevent data size accesses which are mismatched to the encryption algorithm. Without this buffer, writing mismatched data to memory may require reading a block of data, decrypting it, splicing the new data into the decrypted data, re-encrypting it and finally writing the data to memory. Having the cache allows the memory controller not to need this extra logic. The memory controller 120 controls access to the memory 130. The memory controller 120 includes the IEE 125. Various other cores, memory and peripherals may also be connected to the NOC 110 but are not shown. In another embodiment, there is no cache and the memory controller 120 is connected directly to the NOC 110. It will be appreciated by those skilled in the art that there are many different ways for the memory controller and IEE to be connected in a system.

Figure 2:
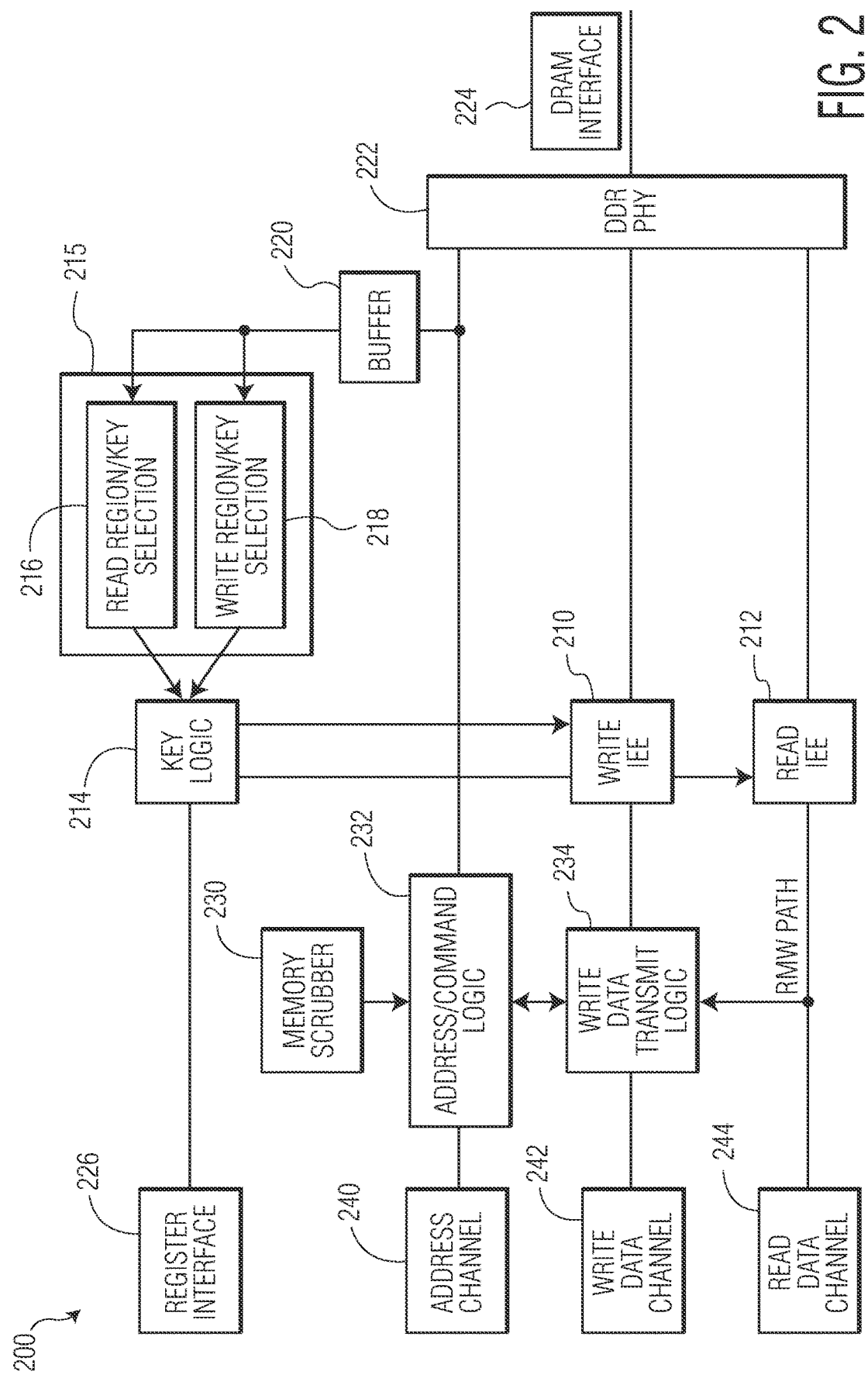
FIG. 2 illustrates a block diagram of a memory controller including inline encryption.

FIG. 2 illustrates a block diagram of a memory controller including inline encryption. The memory controller 200 includes a write IEE 210, read IEE 212, key logic 214, key selector 215 including a read region key selector 216 and a write region selector 218, buffer 220, DDR PHY 222, DRAM interface 224, address/command logic 232, write data transmit logic 234, and memory scrubber 230. The block diagram of the memory controller 200 is a simplification of the memory controller so that the key features of the embodiment may be described. The memory controller 200 may include various other elements and features that are typically found in memory controllers.

The memory controller 200 may be connected to the cache, processor cores (or other system elements) via a write data channel 242, a read data channel 244, and an address channel 240. The address channel 240 may support simultaneous use of both the write data channel 242 and the read data channel 244. The write data channel 242, read data channel 244, and address channel 240 may be implemented by one or more suitable communication buses, such as an Advanced eXtensible Interface (AXI), an Advanced High-performance bus (AHB), or other suitable bus (es), or a combination thereof. As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The memory controller 200 may receive address and other command information on an address channel 240. The data to be written to the DRAM is received on the write data channel 242. The data to be read from the DRAM is output on the read data channel 244.

The memory controller 200 may be connected to the DDR memory using one or more suitable communications buses, such as the DDR PHY 222 which implements the DRAM Interface 224. The DRAM interface 224 may use any available memory interface protocol. Accordingly, the memory controller 200 has a DFI DRAM command interface that is part of the DRAM interface 224 where commands are sent to the DRAM and status and other information is received back from the DRAM. DRAM interface 224 also has a DFI write data channel interface where data to be written to the DRAM is output. The DRAM interface 224 has a DFI read data channel interface where data read from the DRAM is received.

The address/command logic 232 acts as a controller for the memory controller 200. The address/command logic 232 receives address and command information from the address channel 240. For example, when data is to be written, a write command and the address to write to is received by the address/command logic 232 from the core via the address channel 240. The data to be written is received on the write data channel 242 and the write data transmit logic coordinates with the address/command logic 232 to provide the data to be written to the write IEE 210. The write IEE 210 encrypts (when requested) the data to be written to the DRAM. The write IEE 210 then provides the encrypted data to be written to the DDR PHY 222 which then writes the data in the DRAM.

When data is to be read, a read command and the address of the data in the DRAM is received by the address/command logic 232 from the core via the address channel 240. The address/command logic 232 sends a read command and the address to the DDR PHY 222 which then reads the data from the DRAM. The DDR PHY 222 transmits the data read from the DRAM to the read IEE 212. The read IEE 212 decrypts (when the data is encrypted) the data read from the DRAM and then outputs the decrypted data on the read data channel 244. Because they are pipelined, the write IEE 210 and read IEE 212 may accept a block of data and key every clock cycle. This allows the IEEs to operate at the full memory speed. The latency of the write IEE 210 and read IEE 212 will depend on the encryption algorithm used and may vary from one to a few tens of clock cycles.

Different encryption keys may be used for different address regions of the memory. This helps to make data stored in the DRAM more secure. Further, using different keys for different regions of the memory allow for different applications or users to have different keys to further secure the data in the DRAM from unauthorized access or manipulation. Accordingly, the write IEE 210 and read IEE 212 need to know which key to use when encrypting and decrypting data written to or read from the DRAM. The key logic 214 provides the correct keys to the write IEE 210 and read IEE 212. The key logic 214 includes registers for storing the different keys for the various regions of the DRAM, i.e., the memory is divided into regions where each region has a key associated with it. The key logic 214 may be configured and receives key values via a register interface 226. Such keys will be installed when the system restarts. Also keys may be updated as will be further described below. In order to determine the key to be used by the write IEE 210 and read IEE 212 at any given time, a buffer 220 receives address information from the address/command logic. A key selector 215 reads address information from the buffer 220. If the address is for a read command, then the read region/key selection logic 216 determines the memory region associated with the read address, and provides this region information to the key logic 214 that then provides the key for indicated region to the read IEE 212. Likewise, if the address is for a write command, then the write region/key selection logic 218 determines the memory region associated with the write address, and provides this region information to the key logic 214 that then provides the key for indicated region to the write IEE 210. During normal operation there may be both memory write requests and memory read requests. Both the read region/key selection logic 216 and write region/key selection logic 218 may select different regions/keys simultaneously. While the key selector 215 is shown as separate from the key logic 214, the key selector 215, key logic 214, and/or the buffer 220 may be integrated together. In another embodiment, the key logic 214 may be integrated into the write IEE 210 and read IEE 212.

The memory controller 200 includes a memory scrubber 230 that scrubs the DRAM. Memory scrubbing includes reading from each memory location, correcting bit errors (if any) with an error-correcting code (ECC), and writing the corrected data back to the same location. Memory scrubbing of memory is done to correct for errors that may occur in memory due to, for example, radiation. Memory scrubbing is performed as a background task that is it carried out when there is idle time or as a low priority task. The memory scrubber 230 may simply cycle through the memory in a sequential order. When a memory location is to be refreshed, the memory scrubber 230 sends a refresh request to the address/command logic 232. The address/command logic sends a read request to the DRAM for the location to be scrubbed. Then the data read from the DRAM is checked, and if an error is found the data corrected. The corrected data and ECC is then written back to the DRAM. The memory scrubber 230 cycles through the memory refreshing the whole memory periodically. The rate at which the memory is refreshed is based upon the size of the memory and the availability of time to perform the refresh operation. The time to completely scrub the memory may be on the order of hours, but other rates are possible as well. In another embodiment, this same scheme may be used to search for ECC errors without correcting them. In that embodiment, errors would only be detected and reported. In addition, for the key refresh, this memory scrubber may be used in cases where ECC is not enabled. ECC enablement is not a prerequisite to run the memory scrubber for this key refresh process.

Figure 3:
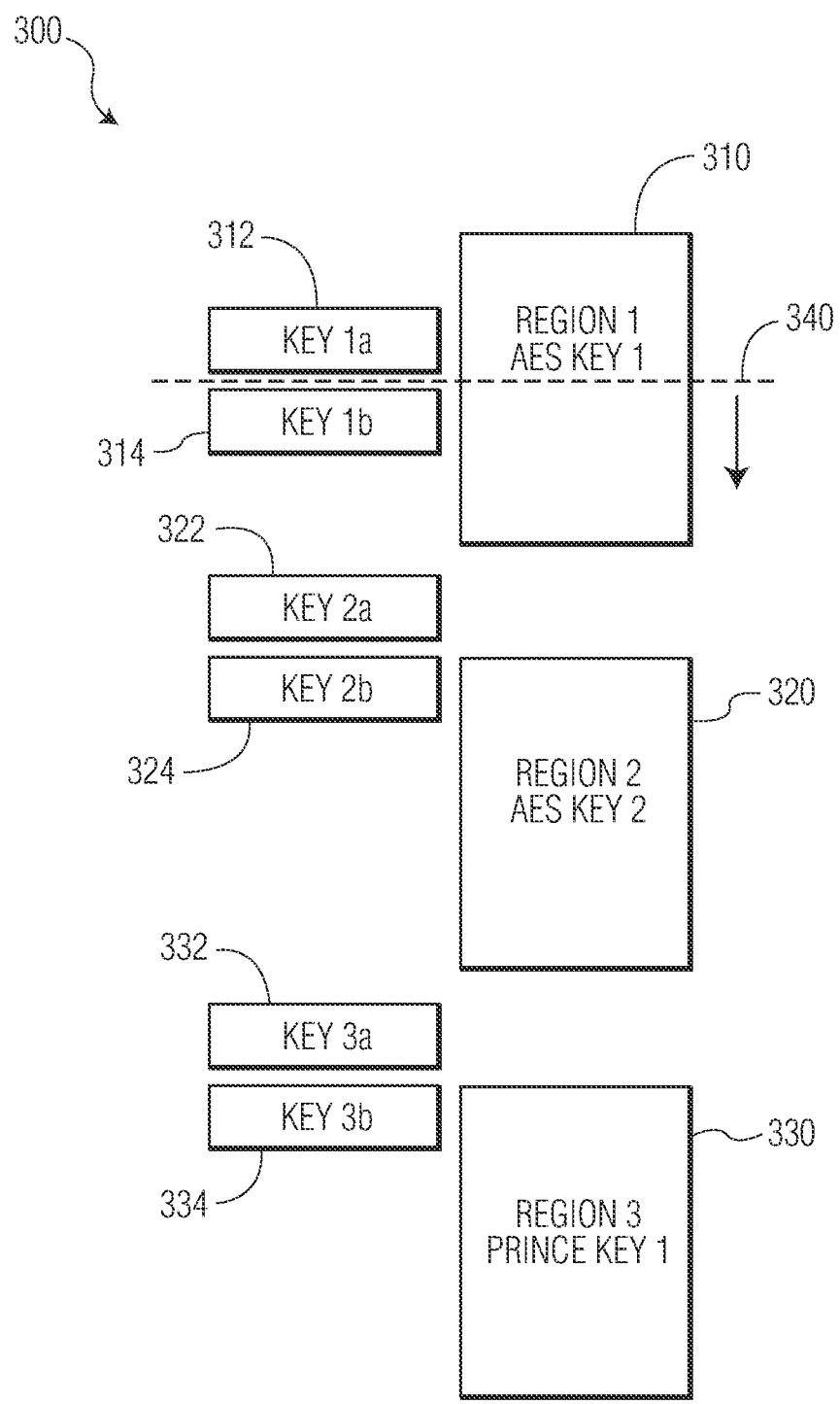
FIG. 3 illustrates memory regions and their associated encryption keys.

The scanning function of the memory scrubber 230 may be used in order to drive the update the keys for each region of the memory. FIG. 3 illustrates memory regions and their associated keys. The memory 300 includes region 1 310, region 2 320, and region 3 330. The memory may include any number of regions based upon the specific application. Each region may have an old key and a new key. The old keys are key 1*a* 312, key 2*a*, 322, and key 3*a* 332. The new keys are key 1*b* 314, key 2*b* 324, and key 3*b* 334. When a key update is to occur, a new key is generated for each memory region. Keys for all regions may be updated together or individually. A water level or key update location 340 indicates a boundary between data that is encrypted with the new key and the old key. The memory scrubber 230 moves the location of the key update location 340 as data in the memory is encrypted with the new key. If a key refresh has been indicated, then the data in the location is decrypted using the old key and then re-encrypted using the new key. Then the key update location 340 is moved. This process repeats itself as the memory scrubber 230 scans through the memory checking for and correcting errors. Once, the whole memory has been scanned, the old key values are replaced by the new key values, and the key update location 340 is reset to the beginning of the memory. At this time, the old key and the new key may have the same value until a next key update occurs. In this situation the check for a key update may be skipped, because the old and the new key are the same, so the data if re-encrypted does not change. This may be done to simplify the logic for key selection.

During read and write operations of the memory 300, the key selector 215 determines whether the old key or the new key should be used for decryption/encryption of the data. First the key selector 215 determines the region associated with the address of the data. This may be accomplished, for example, using a lookup table that has the upper and lower addresses for each region. Next, the key selector 215 decides whether the address to be accessed is "above" or "below" the key update location 340. This may be as simple as determining that the value of the address to be accessed is greater than or less than the key update location 340. In FIG. 3, if the key update location 340 moves downward, then memory locations above the key update location 340 have been re-encrypted with a new region key and hence the new key should be sent to the write IEE 210 or the read IEE 212. Otherwise the old key is sent to the write IEE 210 or the read IEE 212. The key logic 214 may receive the region indication and whether the old or new key is to be used, and then send the correct key to the write IEE 210 or the read IEE 212.

While a region is being scrubbed, and data is being re-encrypted using the new key, other normal memory requests may also occur. A memory access that is to a memory location below the key update location 340 will be encrypted using the old key 312, while a memory access to a location at or above the key update location 340 will be encrypted using the new key 314. Thus, key refresh may occur while the memory continues to be actively used.

For the above description, it is assumed that a key refresh starts at the beginning of a memory scrubbing scan. As a result, when a key refresh is received, the new keys should be updated when the memory scrub begins at the beginning of the memory. This could delay the update of the key refresh. If a quicker key refresh is needed, a key refresh start location is noted at the location where the key refresh begins. Then when the address comparison is made to the key update location, the following comparison is made (ADD−KEYSTART) mod N>(UPLOC−KFYSTART) mod N, where ADD is the memory address being accessed, KFYSTART is the key refresh start location, N is the address space size, UPLOC is the key update location 340. Then the key selection logic 215 signals the key logic 214 to update the old keys when the key update location 340 returns to the key refresh start location.

Another approach for managing access to the memory while the keys are being updated may include a refresh flag for each region that indicates whether the region is undergoing a key refresh. If the region is not currently undergoing a key refresh, then the old key is used to read or write the data. If the region is undergoing a key refresh, then the key to use in accessing the data in the memory will be decided based upon the memory location relative to the water line. That is, if the memory location has been refreshed, then the new key is used. If the memory location has not been refreshed, then the old key is used. When the memory scrubber starts on a region, the refresh flag for that region is set to indicate that the region is being refreshed. Once the whole region has been refreshed, the refresh flag is reset to indicate that the region is not being refreshed and the new key replaces the old key.

The key refresh process is described above as occurring in conjunction with the memory scrubbing function. If there is a need for the key refresh to occur at a different rate, the key refresh process may use logic in the memory scrubber to scan the memory independent of the memory scrubbing to perform the ECC bit error corrections.

Because the key refresh is done in the background, the key refresh is accomplished with minimal performance impact on the memory and the memory remains available for use during the key refresh.

Figure 4:
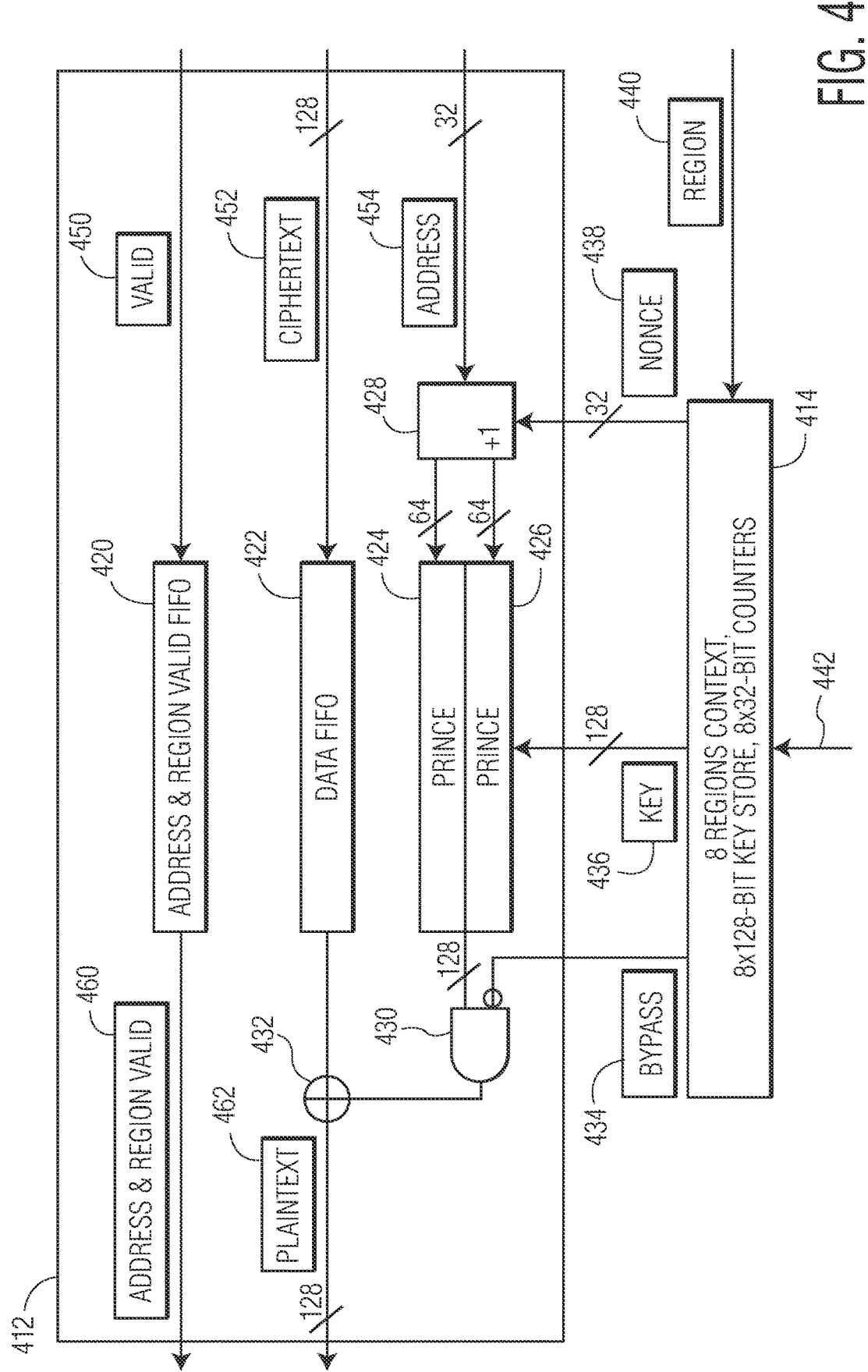
FIG. 4 illustrates an embodiment of a read IEE for use with a read only memory.

The read IEE 212 and write IEE 210 may be implemented in various ways using different encryptions schemes. FIG. 4 illustrates an embodiment of a read IEE for use with a read only memory. The read IEE 412 uses a lightweight PRINCE encryption engine in Counter mode to decrypt encrypted data read from the memory. Other encryption algorithms may also be used such as AES. A lightweight encryption algorithm is useful in an application such an inline encryption as it can be performed with a lower latency than AES and using less logic. Counter mode should only be used with Read-only applications, such as encrypted Flash or other pre-encrypted code image, as a key and single counter value should not be used to encrypt more than one block of data. Counter mode is described in NIST document SP800-38a, and although it is described using the AES encryption algorithm it can be used with other algorithms such as PRINCE. The decryption is done using an XOR 432 that XORs a ciphertext 452 with an encryption of a counter value. In this example, the data address 454 is a 32-bit address and the ciphertext is 128 bits. The PRINCE encryption algorithm has a 64-bit block size, and so two PRINCE encryption engines are used in parallel. A nonce 438 is concatenated with the address 454 by a concatenator 428 to form a counter value which is input into a first instance of the PRINCE encryption engine 424. The nonce 438 is also concatenated with the address 454 plus 1 by the concatenator 428 and input into a second instance of the PRINCE encryption engine 426. The output of the PRINCE encryption engines 424, 426 are concatenated and input into an AND gate 430. The AND gate 430 receives a bypass signal 434 that is inverted at the input to the AND gate 430. If the bypass signal is 1 (or a string of 1s) it indicates the ciphertext 452 read from the memory is not to be decrypted. This may mean that the ciphertext 452 is actually not encrypted data, or the encrypted data is to be output from the read IEE 412. The bypass signal 434 is inverted to 0 (or a string of 0s) and when ANDed with the concatenated output of the PRINCE encryption engines 424, 426, results in a string of 128 0s. When this string of 128 0s is XORed with the ciphertext 452 the output of the XOR 432 is the ciphertext. This allows for a region to be identified as containing plaintext that does not need to be decrypted.

When the bypass signal is 0, then a 1 is ANDed with the output of the PRINCE encryption engines 424, 426 so that the output is not changed. The output of the AND 430 is then XORed with the ciphertext to decrypt the ciphertext resulting in plaintext 462.

Because the PRINCE encryption algorithm has multiple steps or stages to encrypt input data, a data first-in-first-out buffer (FIFO) 422 may be used to pipeline the ciphertext 452 while the associated counter is moving through the stages of the PRINCE encryption engines 424, 426. This pipelined architecture allows data and key to be input into the read IEE 412 every clock cycle, and the read IEE 412 is able to keep up with the data flow through the memory controller 200 in real-time.

Further, an address and region valid FIFO 420 receives a valid flag 450 associated with each read access of the memory. As the pipelined structure is in continuous operation even when new data is not input, read IEE 412 outputs an address and region valid flag 460 that tells the core reading the plaintext output 462 that the output is valid.

Key logic 414 provides an encryption key 436, bypass flag 434, and the nonce 438 to the read IEE 412. The key logic also receives a region input 440 that indicates the region in which the data to be read is stored. The key logic 414 also receives keys, nonces, etc. from interface 442 and stored in the key logic 414. Further, in this example, the memory may have 8 regions and thus there will be 8 keys. Further, 8 nonces are stored one for each of the regions. In the read-only mode (i e, encrypted flash), there is no key-refresh. A new key will be used only when the encrypted flash image is updated. The key will be selected by the person encrypting the image (external to IEE).

In the example above, a PRINCE encryption engine is used. In other embodiments, other encryption algorithms such as AES may be used as well depending upon the specific requirements of the application. Further, a ciphertext width of 128-bits is shown. Other ciphertext widths may be used, and as a result, the number of instances of the PRINCE encryption engine will be varied accordingly. Further, the number of permutations of the counter may be varied. For example, for a 256-bit ciphertext width, 4 PRINCE encryption engines may be used, and 4 variations of the counter +0, +1, +2, and +3 may be used. Further, if the address width is different, the size of the nonce may change accordingly.

Figure 5:
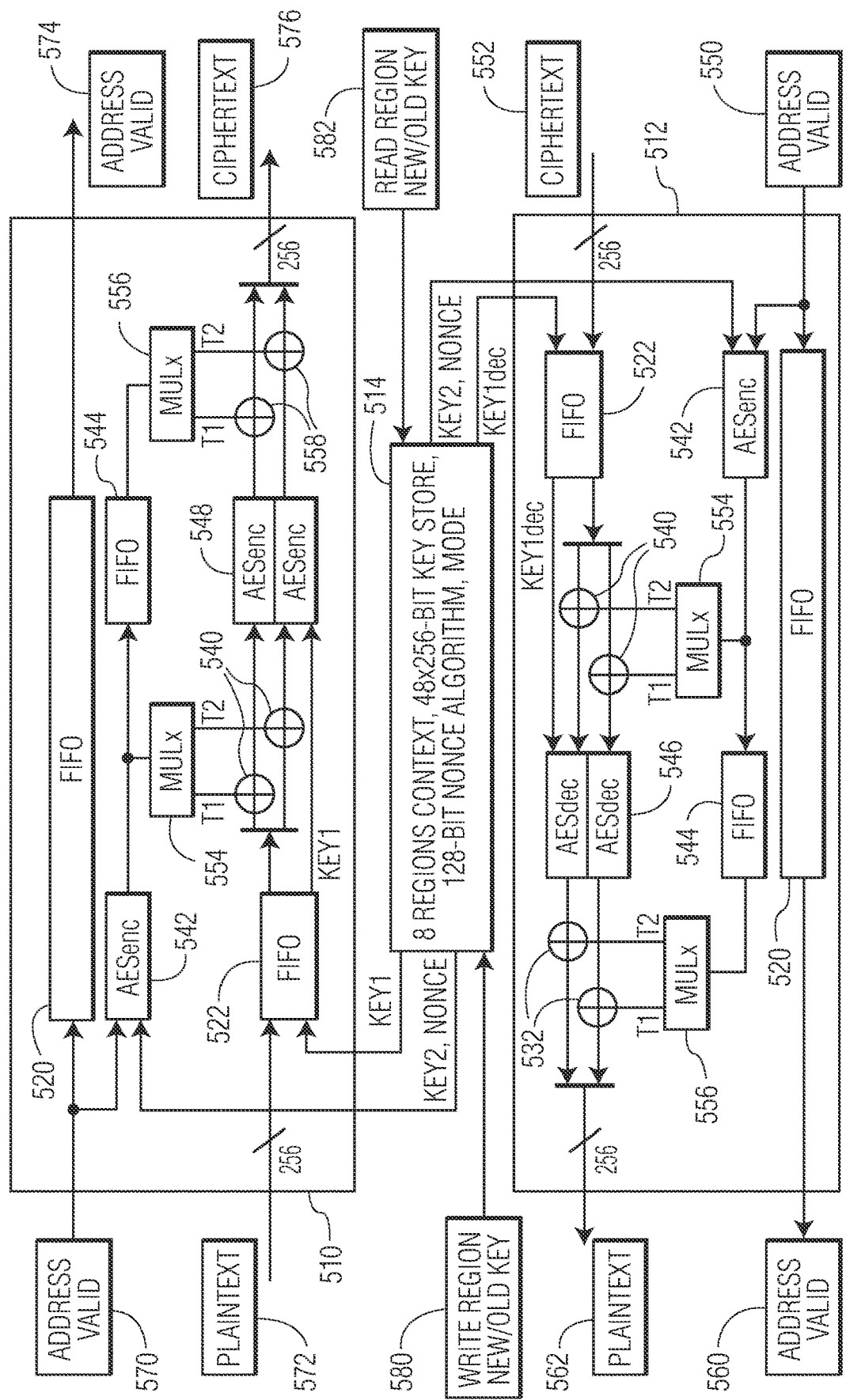
FIG. 5 illustrates an embodiment of a write IEE and read IEE using AES in XTS mode.

FIG. 5 illustrates an embodiment of a write IEE and read IEE using AES in XTS mode. XTS is specified in NIST document SP800-38e and is intended for use in data storage applications. Although it is specified as using AES, it may also be used with other encryption algorithms. XTS mode encrypts a data sequence number to generate a tweak value. In an embodiment, a nonce may be concatenated with the memory address and used as the data sequence number. The write IEE 510 and the read IEE 512 have a mirrored structure. For ease of description the same number is used to label the same item in both the write IEE 510 and the read IEE 512. The read IEE 512 will first be described. In an embodiment, the ciphertext 552 may be 256-bits wide while an AES data block size is 128 bits. Thus, two AES engines 546, 548 may be used in parallel to match the ciphertext size. The read IEE 512 uses an AES decryption engine 546 to decrypt encrypted data read from the memory. Further, an AES encryption engine 542 is used to encrypt the data sequence number, and this encrypted data sequence number is used to generate tweaks that are XORed with the input ciphertext 552 and the output of the AES engine 546.

The read IEE 512 receives a ciphertext input 552 that is input into a first FIFO 522. This first FIFO 522 helps to keep the input ciphertext data in order and synchronized with the output of the data sequence number AES encryption engine 542. The first FIFO 522 also receives a first derived key Key1dec that is derived from a first key Key1 being the final generated AES round key. Key1dec moves through the first FIFO 522 along with its associated ciphertext. In other embodiments, Key1 and Key1dec may be the same value.

A nonce is concatenated with an input address associated with the ciphertext being read and input into the AES encrypt engine 542. The AES encrypt engine 542 also receives a second key Key2. The AES engine 542 encrypts data sequence number comprised of the received nonce and address using Key2. The output of the AES encrypt engine 542 is input into a second FIFO 544 that pipelines the encrypted data sequence number so that it may be used at both the input and the output of the AES decryption engine 546. The encrypted data sequence number is also input into a MULx function 554 (a data rotation and conditional XOR as defined by the XTS standard) to generate two tweaks $T_1$ and $T_2$. These tweak values are each XORed with half of the ciphertext from the first FIFO 522 using XORs 540. Each of the outputs of the XORs 540 is input into a separate instance of the AES decryption algorithm in the AES decryption engine 546. The output of the second FIFO 544 is also input into the MULx function 556 two produce the same tweaks $T_1$ and $T_2$ generated by the MULx function 554, and tweaks $T_1$ and $T_2$ are also XORed with the outputs of the AES decryption engine 546 by XORs 558. The outputs of the XORs 558 are concatenated together to produce the plaintext 562.

A second FIFO 520 receives a valid flag as part of the address and valid flag input 550. The second FIFO 520 pipelines the address valid flags so that they are synchronized with the plaintext output 562. The address valid flag indicates when data received at the plaintext output is valid.

The write IEE 510 has almost the same structure and operation as the write IEE 512, but with a few differences. The write IEE 510 receives plaintext 512 and address and address valid flags 570 as input. The plaintext 512 after moving through first FIFO 522 is encrypted by AES encryption engine 548 using Key1. Otherwise, the operation of the write IEE 510 proceeds in the same manner as for the read IEE 512.

Key logic 514 provides encryption keys Key1, Key2 and the nonce to the write IEE 510. Key logic 514 provides decryption keys Key1dec, Key2 and the nonce to the read IEE 512. The key logic also receives inputs indicating the write region and new/old write key 580 and read region and new/old read key 582. The region input indicates the region in which the data is to be read or stored. The old/new key input is an indication of whether the old key or the new key is to be provided to the AES encryption/decryption engine 548, 546 by the key logic 514. Further, in this example, the memory may have 8 regions. This means that there will be 48 256-bit keys stored including 6 keys for each region. The 6 keys for each region include old and new first keys Key1 and Key1dec and old and new second keys Key2. Further, 8 nonces are stored, one for each of the regions.

In the example above, an AES encryption/decryption engine is used. In other embodiments, other encryption engines may be used depending upon the specific requirements of the application. Further, a ciphertext width of 256-bits is shown. Other ciphertext widths may be used, and as a result the number of instances of the AES encryption/decryption instances will be varied accordingly. Further, the number of tweaks generated by the MULx functions may be increased or decreased. For example, if the data bus is 128-bits, then only one AES engine is needed along with a single tweak value. In another example, for a 512-bit ciphertext width, 4 AES encryption/decryption instances may be used, and 4 tweaks $T_1$, $T_2$, $T_3$, $T_4$ generated by the MULx function may be used.

Figure 6:
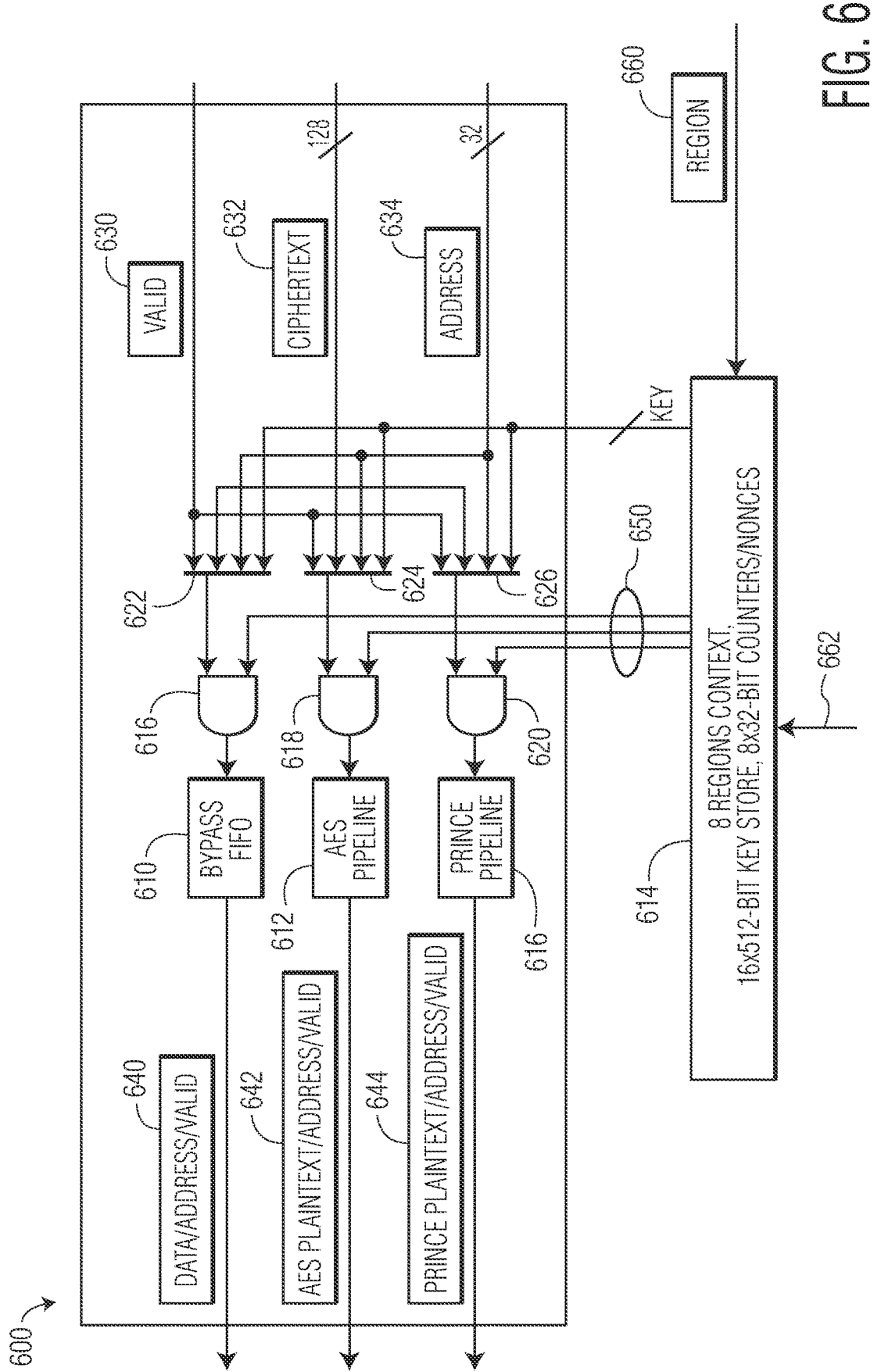
FIG. 6 illustrates a read IEE that includes an AES pipeline, a PRINCE pipeline and bypass mechanism.

A read or write IEE may use more than one type of encryption/decryption algorithm to read and write to a memory. FIG. 6 illustrates a read IEE that includes an AES pipeline, a PRINCE pipeline and a bypass pipeline (for stored plaintext data). These pipelines may have different latencies. The read IEE 600 receives ciphertext 632, an associated address 634, and a valid flag 630. This data is combined 622, 624, 626 with key data from the key logic 614 and input into selection gates 616, 618, 620. The selection gates 616, 618, 620 also receive inputs 650 from the key logic 614 indicating which of the processing pipelines are to be used on the ciphertext 632. Only one of inputs 650 is asserted at a time so that only one of the pipelines is used. If the data is not encrypted, then the bypass FIFO 610 may be used to simply pass the data from the memory to the output along with the associated address and valid flag 640. If the data is encrypted, then the key logic indicates which of the decryption pipelines to use: in this example AES and PRINCE are the options. The selected pipeline 610, 612, 616 is activated by asserting the valid input only to that decryption pipeline 612,616 or bypass FIFO 610 and the plaintext data will be output along with the associated address and valid flag 640/642/644. The key logic will determine which pipeline to use on the ciphertext based upon the region input 660, as each region will be encrypted using a specific known encryption algorithm and mode of operation (such as Counter mode or XTS).

The key logic 614 operates as described above with the addition of outputting a data value indicating which of the processing pipelines is to be used on the data read from the memory. As in the prior examples, the memory may be divided into 8 regions, but more or fewer regions may be used as well. Old and new keys are stored for each region.

Further, a key size is set to accommodate any size key that is required. Also, the key logic 614 stores 8 counter/nonce values to be used as needed by the different decryption pipelines. The size of these counter/nonce values can by any size needed by the decryption pipelines. The architecture of the read IEE 612 using multiple decryption pipelines may also be applied to the write IEE so that it may accommodate different encryption pipelines. This architecture allows the memory controller to allow a memory to use multiple different types of encryption/decryption in the different regions. Further, while the different pipelines are shown as using different encryption/decryption algorithms, multiple pipelines using the same encryption/decryption algorithm may be used with each accommodating a different mode of operation or a different key size. For example, AES may use 128-bit, 192-bit, or 256-bit keys, so different AES encryption/decryption pipelines may be implemented using different key sizes. Alternatively, a single AES pipeline may also be able to accommodate different key sizes.

The read IEE and write IEE may include a clear keys input that sets all keys to zero, or other initialization value, when it has been determined that tampering has occurred. This results in outputs that appear random to an attacker and protects the encrypted data from being exposed to the attacker.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A memory controller, comprising:
 a memory interface connected to a memory;
 an address and control logic connected to the memory interface and a command interface, wherein the address and control logic is configured to receive a memory read request;
 a read inline encryption engine (IEE) connected to the memory interface, wherein the read IEE is configured to decrypt encrypted data read from the memory, wherein the read IEE comprises:
  an encryption engine configured to encrypt a counter based on a read address and a nonce, wherein the read address indicates where the data to be read is stored and is received from the address and control logic;
  a first in first out buffer (FIFO) configured to receive ciphertext data read from the memory;
  an XOR gate configured to XOR the ciphertext from the FIFO with the encrypted counter to produce plaintext;
 a key selector configured to determine a read memory region associated with the memory read request based upon the read address; and
 a key logic configured to select a first key associated with the determined read memory region and provide the selected key to the read IEE.

2. The memory controller of claim 1, further comprising a valid FIFO configured to receive and output valid flags indicating when the associated plaintext is valid.

3. The memory controller of claim 1, further comprising a bypass gate configured to receive the encrypted counter and a bypass signal, and output 0s when decryption is to be bypassed.

4. The memory controller of claim 1, wherein
 the memory has a plurality of different memory regions, and
 the read IEE includes a plurality of different encryption engines implementing different encryption modes of operation, wherein one or more of the plurality of memory regions is associated with one of the plurality of different encryption engines.

5. The memory controller of claim 1, further comprising a write IEE connected to the memory interface, wherein the write IEE is configured to encrypt data to be stored in the memory.

6. The memory controller of claim 5, wherein
 the key selector is configured to determine a write memory region associated with a memory write request based upon a write address where the data to be stored, wherein the write address is received from the address and control logic; and
 the key logic is configured to select the first key associated with the determined write memory region and provide the selected first key to the write IEE.

7. The memory controller of claim 6, wherein
 the key logic is configured to select a second key associated with the determined write memory region and provide the selected second key to the write IEE,
 the write IEE further comprises:
  a first encryption engine configured to encrypt a first data sequence number, based on the write address data and nonce, using the second key;
  a first tweak circuit configured to produce a first tweak based upon the encrypted first data sequence number;
  a first first-in-first-out buffer (FIFO) configured to receive the encrypted data sequence number;
  a second FIFO configured to receive plaintext data to be written into the memory;
  a first XOR gate configured to XOR the plaintext from the second FIFO with the first tweak;
  a second encryption engine configured to encrypt the output of the first XOR using a first key;
  a second tweak circuit configured to produce the first tweak based upon the output of the first FIFO; and
  a second XOR gate configured to XOR the output of the second encryption engine with the first tweak to produce a ciphertext to be written in the memory.

8. The memory controller of claim 7, further comprising a first valid FIFO configured to receive and output valid flags indicating when the ciphertext is valid.

9. The memory controller of claim 7, wherein
 the key logic is configured to select a second key associated with the determined read memory region and provide the selected second key to the read IEE,
 the read IEE further comprises:
  a third encryption engine configured to encrypt a second data sequence number, based on the read address data and nonce, using the second key;
  a third tweak circuit configured to produce a second tweak based upon the encrypted second data sequence number;

a third FIFO configured to receive the encrypted second data sequence number;

a fourth FIFO configured to receive ciphertext data to be read from the memory;

a third XOR gate configured to XOR the ciphertext from the fourth FIFO with the second tweak;

a decryption engine configured to decrypt the output of the third XOR using a first derived key based upon the first key wherein the first derived key may be the same as the first key;

a fourth tweak circuit configured to produce the second tweak based upon the output of the third FIFO; and a fourth XOR gate configured to XOR the output of the decryption engine with the second tweak to produce a plaintext.

10. The memory controller of claim 9, further comprising a second valid FIFO configured to receive and output valid flags indicating when the plaintext is valid.

11. The memory controller of claim 5, further comprising a memory scrubber configured to cycle through memory locations and at each memory location utilizing the read IEE and the write IEE to:

decrypt the stored data using the first key;

encrypt the decrypted stored data using a new first key;

store the data encrypted with the new first key; and update a key update location, wherein the key update location indicates a boundary between data stored in the memory encrypted using the first key and the new first key.

12. The memory controller of claim 5, further comprising a memory scrubber configured to:

cycle through memory locations of the memory at a first rate and at each memory location utilizing the read IEE and write IEE to:

decrypt the stored data using the first key;

encrypt the decrypted stored data using a new first key;

store the data encrypted with the new first key;

update a key update location, wherein the key update location indicates a boundary between data stored in the memory encrypted using the first key and the new first key; and scan through the memory at a second rate to correct data errors using an error correction code, wherein the first and second rates are different.

13. A memory controller, comprising:

a memory interface connected to a memory;

an address and control logic connected to the memory interface and a command interface, wherein the address and control logic is configured to receive a memory access request and a write memory request;

a read inline encryption engine (IEE) connected to the memory interface, wherein the read IEE is configured to decrypt encrypted data read from the memory;

a write IEE connected to the memory interface, wherein the write IEE is configured to encrypt data to be stored in the memory;

a key selector configured to:

determine a read memory region associated with the memory read request based upon a read address where the data to be read is stored, wherein the read address is received from the address and control logic; and determine a write memory region associated with the memory write request based upon a write address where the data is to be stored, wherein the write address is received from the address and control logic;

a key logic configured to select a first old key or a first new key associated with the determined read or write memory region based upon a key update location, wherein the key update location indicates a boundary between data stored in the memory encrypted using the first key and the new first key; and provide the selected key to the read or write IEE.

14. The memory controller of claim 13, further comprising a memory scrubber configured to cycle through memory locations and at each memory location utilizing the read IEE and the write IEE to:

decrypt the stored data using the first key;

encrypt the decrypted stored data using a new first key;

store the data encrypted with the new first key; and update the key update location.

15. The memory controller of claim 14, further comprising a memory scrubber configured to:

cycle through memory locations of the memory at a first rate; and at each memory location utilizing the read IEE and the write IEE to:

decrypt the stored data using the first key;

encrypt the decrypted stored data using a new first key;

store the data encrypted with the new first key;

update the key update location; and scan through the memory at a second rate to correct data errors using an error correction code, wherein the first and second rates are different.

\* \* \* \* \*